F. ALTERGOTT, Jr.
FASTENING DEVICE FOR TIRE CHAINS.
APPLICATION FILED FEB. 21, 1919.
1,310,171.
Patented July 15, 1919.
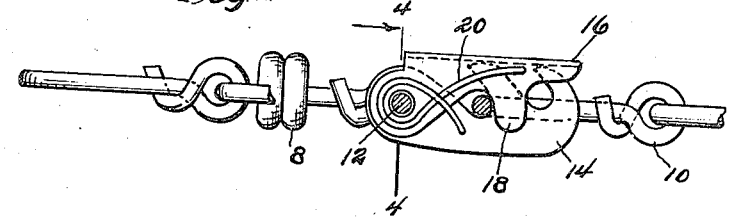
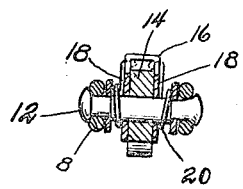
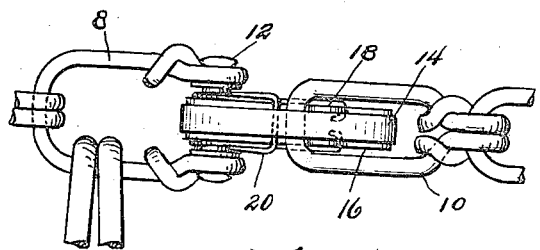
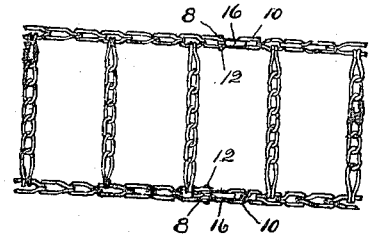
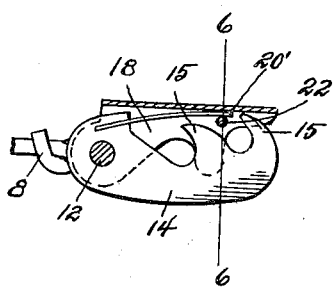
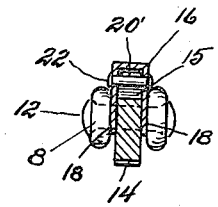

UNITED STATES PATENT OFFICE.

FRED ALTERGOTT, JR., OF KANSAS CITY, MISSOURI.

FASTENING DEVICE FOR TIRE-CHAINS.

1,310,171.	Specification of Letters Patent.	Patented July 15, 1919.

Application filed February 21, 1919. Serial No. 278,524.

*To all whom it may concern:*

Be it known that I, FRED ALTERGOTT, Jr., a citizen of the United States, residing at Kansas City, in the county of Jackson and State of Missouri, have invented certain new and useful Improvements in Fastening Devices for Tire-Chains, of which the following is a full and exact specification.

The present invention relates to detachable fastening devices, and more particularly to fastening devices for the end portions of anti-skid tire chains, and aims to provide an improved device of this character whereby such fastening means may be more conveniently manipulated and also form a more secure connection between the end portions of the chain and less likely to become disconnected.

For this purpose I provide a detachable connection comprising adjustable chain engaging means and including a keeper element which is spring-actuated into normally closed position, the outer face of the keeper element forming a tread surface intermediate the end portions of the chain and the spring element of the device exerting its force for maintaining said keeper element closed in the same direction as any pressure contact to which said keeper element may be subjected due to its forming a part of the chain.

It is also sought to devise a neat, and comparatively simple and compact construction of the character described and one which will be inexpensive to manufacture.

With this general object in view, the invention will now be described with reference to the accompanying drawing illustrating a construction which has been devised for embodying the proposed improvements, after which the novel features therein will be set forth and particularly defined in the appended claims.

In the drawing—

Figure 1 is a plan view of the end portions of a tire chain provided with detachable fastening devices embodying the present improvements;

Fig. 2 is a side view of the same, on an enlarged scale;

Fig. 3 is an inverted plan view of one of the fastening devices with the adjacent links of the tire chain;

Fig. 4 is a section taken on the line 4—4 of Fig. 2;

Fig. 5 is a side view of the device with the keeper or closure member in longitudinal section and showing a modified form of the spring element for said keeper member; and Fig. 6 is a section taken on the line 6—6 of Fig. 5.

Referring now to the said drawing in detail, this shows a tire chain having one end portion thereof provided with links 8 carrying the improved fastening means adapted for detachably and adjustably engaging the links 10 of the other end portion of said chain. Each of the links 8 is provided with a transverse pin 12 upon which is pivoted a retaining element 14 formed with a plurality of outwardly projecting teeth 15 for adjustable engagement with the corresponding link 10. Also pivotally mounted on the pin 12 is a keeper or closure element 16 extending substantially the full length of the retaining element 14 and thereby constituting a closure for the retaining pockets or recesses which are formed by said teeth 15. The exterior face of the keeper element is thus disposed to form a tread surface at this point between the end portions of the chain, and each of said elements 16 is also provided with inwardly projecting side portions or flanges 18 embracing the opposite sides of the retaining element 14 and thereby maintaining the keeper securely alined with said retaining element.

For maintaining the keeper element 16 normally in proper closure position, I provide a spring member 20 which, in the construction shown in Figs. 2 to 4, is coiled about the pin 12, one end of the spring being embedded in the retaining element 14 and the other end of the spring being attached to the keeper element 16 at some distance from said pin 12. In Figs. 5 and 6 I show a flat leaf spring 20', one end of which is embedded in the retaining member 14 adjacent the pin 12, the other end of said spring engaging a pin 22 carried by the keeper element 16 at some distance from the pin 12. By means of either of these arrangements of spring elements, the keeper element is actuated in a direction to maintain the same normally closed over the teeth 15, the action of the spring being in the same direction as that of the tread pressure to which the chain and its connections are being subjected when in use.

It will thus be apparent that I have provided a simple and efficient arrangement and construction of fastening means for carrying out the desired objects of the invention. The device described forms a strong and adjustable fastening connection, and the closure elements or keepers 16 serve to maintain the links 10 in securely retained position by holding said links in proper engagement with the teeth 15. This retaining action is assured by the action of the springs 20 which serve to hold the keeper elements at all times in proper closed position, and the spring action being exerted in an inward direction its effect will simply be reinforced by any contacting pressure upon the keeper elements 16, such as occurs when the fastening devices come in contact with curbs, or with the sides of ruts, as will be readily understood. A more convenient structure is also provided by this spring-actuated closure arrangement than is the case with a keeper which is held closed merely by frictional retaining means, since the present closure may be more readily manipulated at all times on account of its being held only by the spring action, while frictionally held keepers become jammed or stuck and therefore difficult to open, besides having the disadvantage of possessing no means of maintaining them normally closed or automatically closing them in the event of their being casually forced into open or partially open position.

Having described the invention, what I claim as new, and desire to secure by Letters Patent, is:

1. A chain fastening device for tire chains comprising, in combination with the tire chain, a retaining element carried by one end portion of said chain and provided with a plurality of outwardly projecting teeth for detachable engagement with the other end portion of the chain, and a keeper element carried by said retaining element and provided with means for automatically actuating said keeper element to form a closure for the spaces between said teeth.

2. A chain fastening device for tire chains comprising in combination with the tire chain, a retaining element carried by one end portion of said chain and provided with a plurality of outwardly projecting teeth for detachable engagement with the other end portion of the chain, a keeper element carried by said retaining element and forming a closure for the spaces between said teeth and having inwardly projecting side portions embracing the opposite sides of said retaining element, and a spring element actuating said keeper element to normally force the same inward into closed position.

In witness whereof I hereto affix my signature.

FRED ALTERGOTT, Jr.